(12) United States Patent
Zhang et al.

(10) Patent No.: US 12,405,248 B2
(45) Date of Patent: Sep. 2, 2025

(54) EDDY CURRENT FLAW DETECTION SYSTEM BASED ON NV COLOR CENTER QUANTUM SENSING TECHNOLOGY AND DETECTION METHOD THEREOF

(71) Applicant: ANHUI GUOSHENG QUANTUM TECHNOLOGY CO., LTD., Hefei High tech Zone (CN)

(72) Inventors: Shaochun Zhang, Hefei High tech Zone (CN); Bowen Zhao, Hefei High tech Zone (CN); Peng Wang, Hefei High tech Zone (CN); Dacheng Luo, Hefei High tech Zone (CN); Zhen Zhang, Hefei High tech Zone (CN); Xin Liu, Hefei High tech Zone (CN)

(73) Assignee: Anhui Guosheng Quantum Technology Co., Ltd., Anhui (CN)

( * ) Notice: Subject to any disclaimer, the term of this patent is extended or adjusted under 35 U.S.C. 154(b) by 190 days.

(21) Appl. No.: 18/228,332

(22) Filed: Jul. 31, 2023

(65) Prior Publication Data
US 2024/0102963 A1    Mar. 28, 2024

(30) Foreign Application Priority Data

Sep. 25, 2022 (CN) .......................... 202211168879.1

(51) Int. Cl.
*G01N 27/90* (2021.01)
*G08B 21/18* (2006.01)

(52) U.S. Cl.
CPC ....... *G01N 27/9006* (2013.01); *G08B 21/182* (2013.01)

(58) Field of Classification Search
CPC ..................... G01N 27/9006; G08B 21/182
USPC ......................................................... 324/222
See application file for complete search history.

(56) References Cited

FOREIGN PATENT DOCUMENTS

| CN | 106290560 A | * | 1/2017 | ......... G01N 27/9006 |
| WO | WO-2009059034 A1 | * | 5/2009 | ............. A61B 3/102 |
| WO | WO-2019196998 A1 | * | 10/2019 | ......... G01N 27/9086 |

OTHER PUBLICATIONS

Zhang et al; Translation of CN 106290560 A; Pub. Date Jan. 4, 2017; Translated by Google & EPO (Year: 2017).*

(Continued)

*Primary Examiner* — Eman A Alkafawi
*Assistant Examiner* — Rahul Maini (57) ABSTRACT

Disclosed is an eddy current flaw detection system based on a NV (nitrogen-vacancy) color center quantum sensing technology, relating to the technical field of quantum sensing. The system includes a laser transceiver processing unit, a quantum sensor, an excitation coil, a power supply unit, a microwave coil, and a microwave unit. The diamond NV color center precision measurement technology and the eddy current nondestructive flaw detection technology are combined in accordance with the present disclosure. Compared with the traditional technology, the remarkable performance of the diamond NV color center can improve the accuracy of eddy current nondestructive flaw detection and achieve the accurate detection of fine crack defects. Meanwhile, a detection method for an alternating current magnetic field is designed according to the characteristics of the eddy current nondestructive flaw detection.

8 Claims, 6 Drawing Sheets

(56) References Cited

OTHER PUBLICATIONS

Patel et al.; "High Sensitivity Fiber-coupled Magnetometry Using an Ensemble of Nitrogen-Vacancy Centers in Diamond"; Pub. Date Jan. 2022; University of Warwick; pp. 24, 73-75, 89-91 (Year: 2022).*

Duan et al.; "Enhancing fluorescence excitation and collection from the nitrogen-vacancy center in diamond through a microconcave mirror"; Pub. Date Jul. 27, 2018; Applied Physics Letters; 113, 041107; pp. 1-5 (Year: 2018).*

* cited by examiner

EDDY CURRENT FLAW DETECTION SYSTEM BASED ON NV COLOR CENTER QUANTUM SENSING TECHNOLOGY AND DETECTION METHOD THEREOF

CROSS-REFERENCE TO RELATED APPLICATION

This patent application claims the benefit and priority of Chinese Patent Application No. 202211168879.1, filed with the China National Intellectual Property Administration on Sep. 25, 2022, the disclosure of which is incorporated by reference herein in its entirety as part of the present application.

TECHNICAL FIELD

The present disclosure relates to the technical field of eddy current flaw detection system based on a NV (nitrogen-vacancy) color center quantum sensing technology and a detection method thereof.

BACKGROUND

As diamond NV color center shows strong fluorescence under the laser pumping, and its zero-phonon line can be observed at room temperature, the diamond NV color center can be used as a nano-sized sensor for high-precision measurement of magnetic fields, electric fields, temperature and other physical quantities. The combination of the NV color center sensing technology and the nondestructive flaw detection has broad prospects.

In the field of nondestructive flaw detection, eddy current testing is one of the most important testing technologies, which is based on the theory of electromagnetic induction. When a conductor is placed in an alternating magnetic field, an induced current will be formed around the conductor, which causes eddy current. When the conductor changes in defects, size and shape, eddy current also changes under its influence, and the effective testing of the state and property of the conductor can be achieved by this phenomenon.

However, in the prior art, there is a lack of research on combining the NV color center precision measurement technology with the eddy current nondestructive flaw detection technology. Based on this, an eddy current flaw detection system based on a NV color center quantum sensing technology and a detection method are designed in the present disclosure to solve the problems above.

SUMMARY

The present disclosure provides an eddy current flaw detection system based on a NV color center quantum sensing technology and a detection method thereof, so as to solve the problems above.

In order to achieve the objective above, the present disclosure provides the following technical solutions: an eddy current flaw detection system based on a NV color center quantum sensing technology includes a laser transceiver processing unit, a quantum sensor, an excitation coil, a power supply unit, a microwave coil, and a microwave unit.

The laser transceiver processing unit is configured to generate trigger light to excite the quantum sensor, collect feedback fluorescence generated by the quantum sensor, and process and analyze the feedback fluorescence.

The microwave unit is configured to generate modulating microwaves, where the modulating microwaves act on the quantum sensor through the microwave coil.

The power supply unit is configured to supply an alternating current to the excitation coil, so as to generate an alternating magnetic field. The alternating magnetic field enables an eddy current to be generated on an object to be detected.

The quantum sensor is configured to sense a surrounding alternating magnetic field and generate feedback fluorescence under the action of the trigger light and the modulating microwaves.

The quantum sensor includes a sensing optical fiber, both ends of the sensing optical fiber are respectively a light input end and a light output end, and the light output end is provided with a diamond NV color center.

As mentioned above, the quantum eddy current nondestructive detection system has a further design as follows: the laser transceiver processing unit includes a laser, a conjugate lens group, a dichroic mirror, an optical filter, a photodetector, a host computer, and an optical fiber coupler. Trigger light generated by the laser is subjected to beam reduction by the conjugate lens group, enters a transmission optical fiber through the optical fiber coupler after being reflected by the dichroic mirror, and then is transmitted into the sensing optical fiber through the transmission optical fiber to trigger the diamond NV color center. Partial feedback fluorescence generated by the diamond NV color center during operation returns along an original light path, the feedback fluorescence directly passes through the dichroic mirror and is collected by the photodetector after stray light is filtered by the optical filter. The host computer is used to process and analyze the feedback fluorescence collected by the photodetector.

As mentioned above, the quantum eddy current nondestructive detection system has a further design as follows: the laser transceiver processing unit further includes an alarm, and the host computer is connected to the alarm and is used to control the alarm.

As mentioned above, the quantum eddy current nondestructive detection system has a further design as follows: the quantum sensor further includes a support sleeve sleeved on the periphery of the sensing optical fiber, and the excitation coil is wound around the support sleeve.

A detection method of an eddy current flaw detection system includes the following steps:

S1, measurement of zero magnetic field resonance splitting value: under a zero magnetic field environment, starting a laser transceiver processing unit and a microwave unit to draw an ODMR (optically detected magnetic resonance) spectrum of a diamond NV color center on a quantum sensor, and obtaining a zero magnetic field resonance splitting value by calculating an inter-peak spacing;

S2, parameter setting and starting: setting operating parameters of a power supply unit, serving the zero magnetic field resonance splitting value as an alternating current frequency, starting the laser transceiver processing unit and the microwave unit at the same time, controlling the quantum sensor to approach a surface of an object to be detected, and sensing a surrounding alternating magnetic field by the quantum sensor, and feeding back a fluorescence signal in time; and S3, analysis and processing: processing and analyzing, by the laser transceiver processing unit, the fluorescence signal to obtain crack information.

As one of the operation methods, during the operation of the system, the microwave unit is controlled to generate a microwave frequency-swept signal with a central frequency of 2.87 GHz, a corresponding ODMR spectrum is obtained by performing fixed-point frequency sweeping on each detection position, magnetic field amplitude information of the corresponding detection position is calculated through an AT splitting value on the ODMR spectrum, and then the crack information is determined according to the magnetic field amplitude information of different detection positions.

As a second operation method, during the operation of the system, the microwave unit is controlled to generate a single-frequency microwave with a set frequency, and a diamond NV color center is excited by the single-frequency microwave at each detection position, so as to obtain a corresponding ODMR spectrum, then detection results of different detection positions are made into a time domain diagram, and whether a crack exists or not is determined according to the fluctuation of the detection results.

Further, during the determination of a set frequency, the microwave unit is firstly controlled to generate a microwave frequency-swept signal with a central frequency of 2.87 GHz, and an ODMR spectrum is obtained performing fixed-point frequency sweeping on a selected detection position, then a microwave frequency value corresponding to the maximum slope point on the spectrum is determined, and the microwave frequency value is used as the set frequency of the microwave unit.

As a third operation method, during the operation of the system, the microwave unit is firstly controlled to generate a single-frequency microwave with a set frequency, a diamond NV color center is excited by the single-frequency microwave at each detection position, so as to obtain a corresponding ODMR spectrum. Detection results of different detection positions are made into a time domain diagram, and whether a crack exists or not is determined according to the fluctuation of the detection results. If determining that the crack exists at a certain part of an object to be detected, the quantum sensor is moved back to the part, then the microwave unit is controlled to generate a microwave frequency-swept signal with a central frequency of 2.87 GHz, a corresponding ODMR spectrum is calculated by performing fixed-point frequency sweeping on the part, magnetic field amplitude information of the part is calculated through an AT splitting value on the ODMR spectrum, and then crack size information is determined according to the magnetic field amplitude information.

Compared with the prior art, the present disclosure has beneficial effects that: the diamond NV color center precision measurement technology and the eddy current nondestructive flaw detection technology are combined in accordance with the present disclosure. Compared with the traditional technology, the remarkable performance of the diamond NV color center can improve the accuracy of eddy current nondestructive flaw detection and achieve the accurate detection of fine crack defects. Meanwhile, a detection method for an alternating current magnetic field is designed according to the characteristics of the eddy current nondestructive flaw detection.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

In the drawings:
1—laser transceiver processing unit, 2—quantum sensor, 3—excitation coil, 4—power supply unit, 5—microwave coil, 6—microwave unit, 11—laser, 12—conjugate lens group, 13—bichroic mirror, 14—optical filter, 15—photodetector, 16—host computer, 17—optical fiber coupler, 18—alarm, 21—sensing optical fiber, 22—diamond NV color center, 23—support sleeve.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Embodiment I

Figure 1:
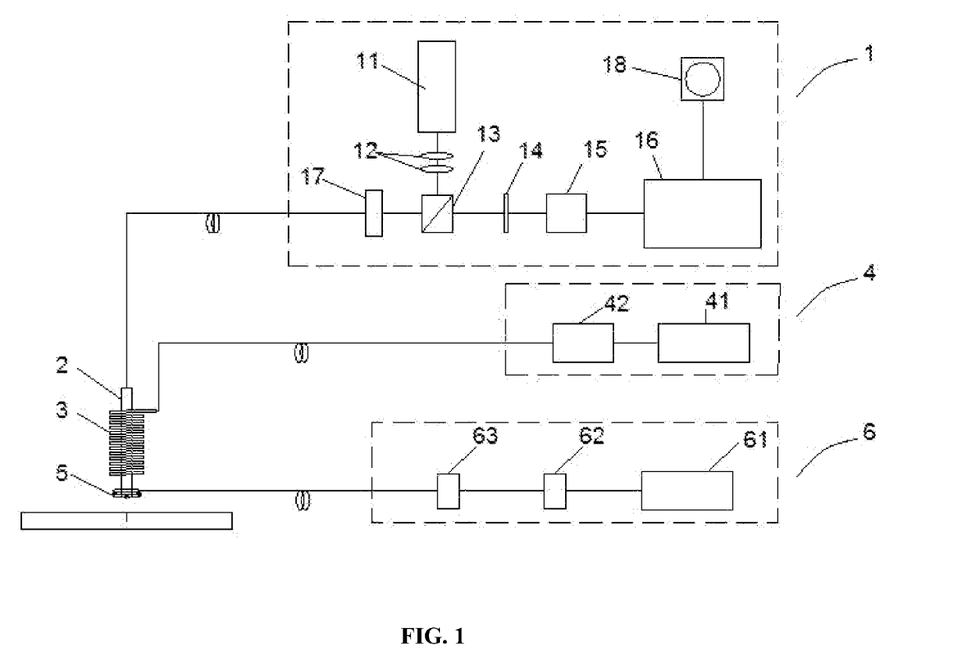
FIG. 1 is a schematic diagram of an eddy current flaw detection system according to an embodiment I.

Referring to FIG. 1, this embodiment provides a solution as follows: an eddy current flaw detection system based on a NV color center quantum sensing technology includes a laser transceiver processing unit 1, a quantum sensor 2, an excitation coil 3, a power supply unit 4, a microwave coil 5, and a microwave unit 6.

The laser transceiver processing unit 1 is configured to generate trigger light to excite the quantum sensor 2, collect feedback fluorescence generated by the quantum sensor 2, and process and analyze the feedback fluorescence.

The microwave unit 6 is configured to generate modulating microwaves, wherein the modulating microwaves act on the quantum sensor 2 through the microwave coil 5.

The power supply unit 4 is configured to supply an alternating current to the excitation coil 3 so as to generate an alternating magnetic field, wherein the alternating magnetic field enables an eddy current to be generated on an object to be detected.

The quantum sensor 2 is configured to sense a surrounding alternating magnetic field and generate feedback fluorescence under the action of the trigger light and the modulating microwaves.

The quantum sensor 2 includes a sensing optical fiber 21, both ends of the sensing optical fiber 21 are respectively a light input end and a light output end, and the light output end is provided with a diamond NV color center 22.

In above solution, more detailed, the laser transceiver processing unit 1 includes a laser 11, a conjugate lens group 12, a dichroic mirror 13, an optical filter 14, a photodetector 15, a host 16 and an optical fiber coupler 17. Trigger light generated by the laser 11 is subjected to beam reduction by the conjugate lens group 12, enters a transmission optical fiber through the optical fiber coupler 17 after being reflected by the dichroic mirror 13, and then is transmitted into the sensing optical fiber 21 through the transmission optical fiber to trigger the diamond NV color center 22. Partial feedback fluorescence generated by the diamond NV color center 22 during operation returns along an original light path, the feedback fluorescence directly passes through the dichroic mirror 13 and is collected by the photodetector 15 after stray light is filtered by the optical filter 14. The host computer 16 is used to process and analyze the feedback fluorescence collected by the photodetector 15. The power supply unit 4 includes an alternating current power supply 41 and a frequency converter 42 connected thereto. The microwave unit 6 is composed of a microwave source 61, a microwave switch 62, and a microwave amplifier 63.

Furthermore, the laser transceiver processing unit further includes an alarm 18, and the host computer 16 is connected to the alarm 18 and is used to control the alarm 18. When the quantum sensor 2 detects the defects, the alarm 18 can give an alarm for prompting.

Figure 2:
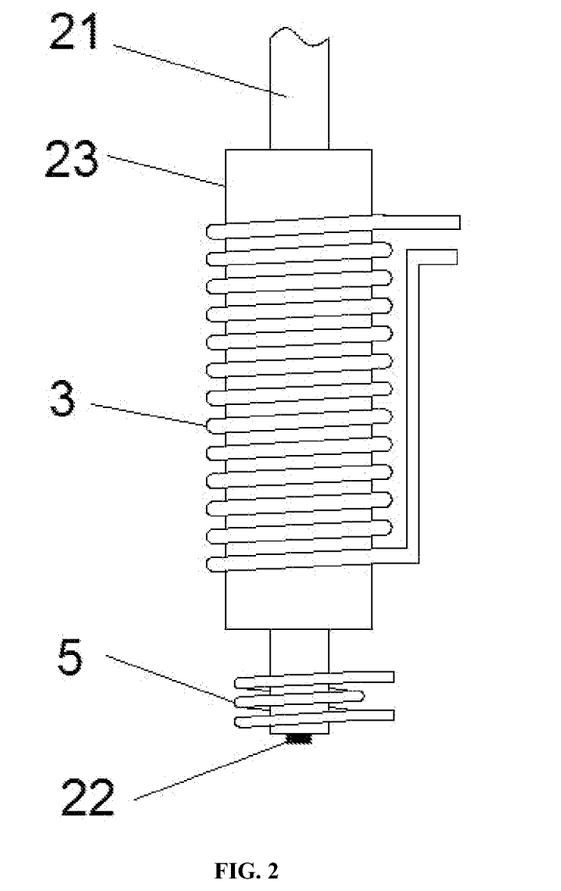
FIG. 2 is a structural schematic diagram of a quantum sensor according to an embodiment I.

Further, as shown in FIG. 2, the quantum sensor 2 also includes a support sleeve 23 sleeved on the periphery of the sensing optical fiber 21, and the excitation coil 3 is wound around the support sleeve 23, which facilitates the fixing of the excitation coil 3 and enables the diamond NV color center 22 to be located at the center of the excitation coil 3.

Figure 3:
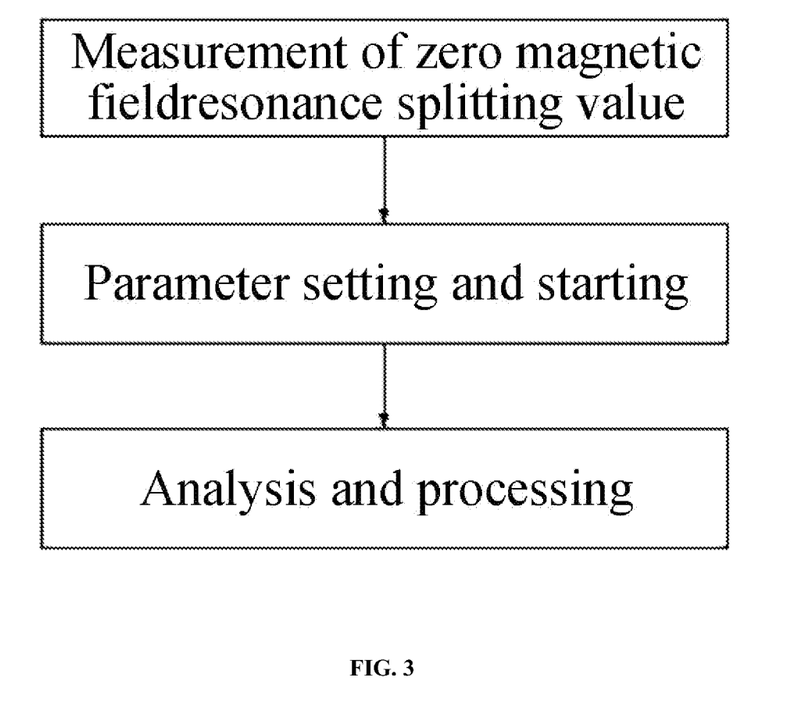
FIG. 3 is a flow chart of a detection method according to an embodiment II.

As shown in FIG. 3, the detection method of the above system is described below.

Figure 4:
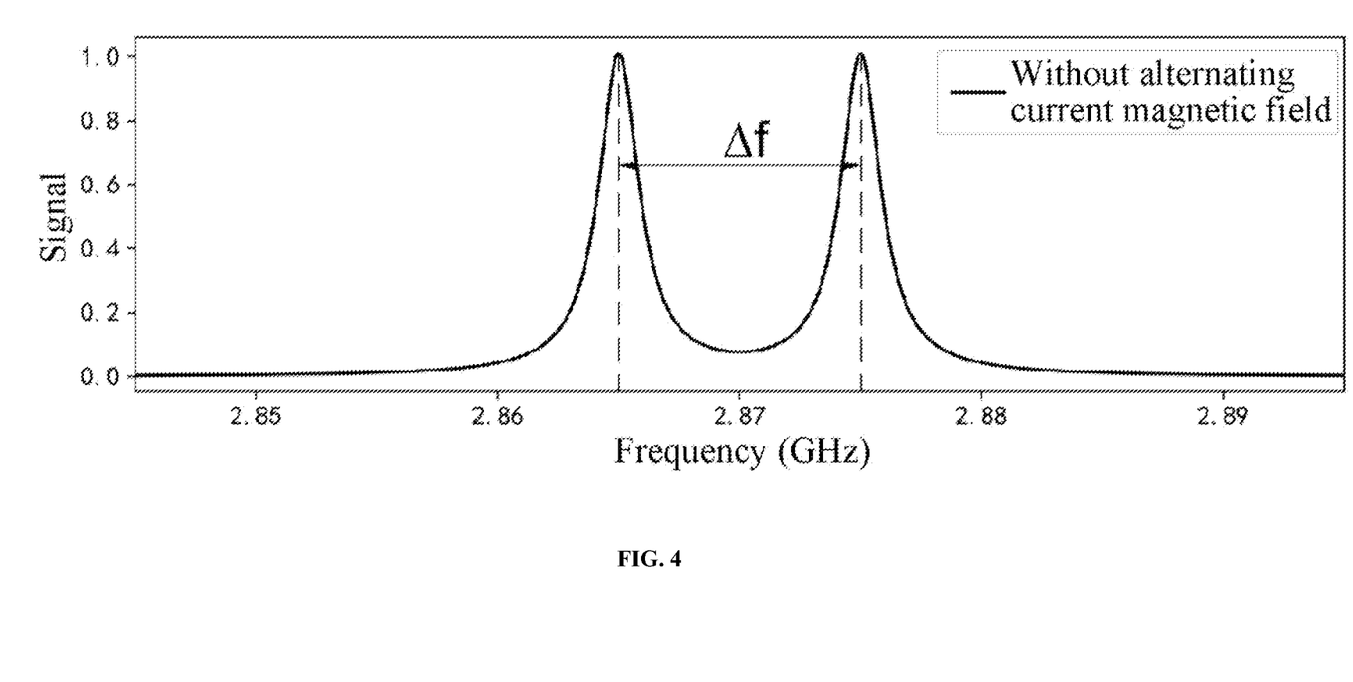
FIG. 4 is an ODMR atlas obtained in an environment without an alternating current magnetic field according to an embodiment I.

S1. Measurement of zero magnetic field resonance splitting value: In a zero magnetic field environment, a laser transceiver processing unit 1 and a microwave unit 6 are started to draw an ODMR spectrum of a diamond NV color center 22 on a quantum sensor 2, as shown in FIG. 4, and a zero magnetic field resonance splitting value $\Delta f$ is obtained by calculating an inter-peak spacing.

S2. Parameter setting and starting: Operating parameters of a power supply unit 4 are set, the zero magnetic field resonance splitting value $\Delta f$ is used as an alternating current frequency, the laser transceiver processing unit 1 and the microwave unit 6 are started at the same time to control the quantum sensor 2 to approach a surface of an object to be detected, and the quantum sensor 2 is used to sense a surrounding alternating magnetic field and feeds back a fluorescence signal in time.

S3. Analysis and processing: The laser transceiver processing unit 1 is used to process and analyze the fluorescence signal, so as to obtain crack information.

A crack appearing on the object to be detected may affect a magnetic field generated by eddy current, and then lead to magnetic field fluctuation. The crack can be detected by magnetic field fluctuation.

Embodiment II

Figure 5:
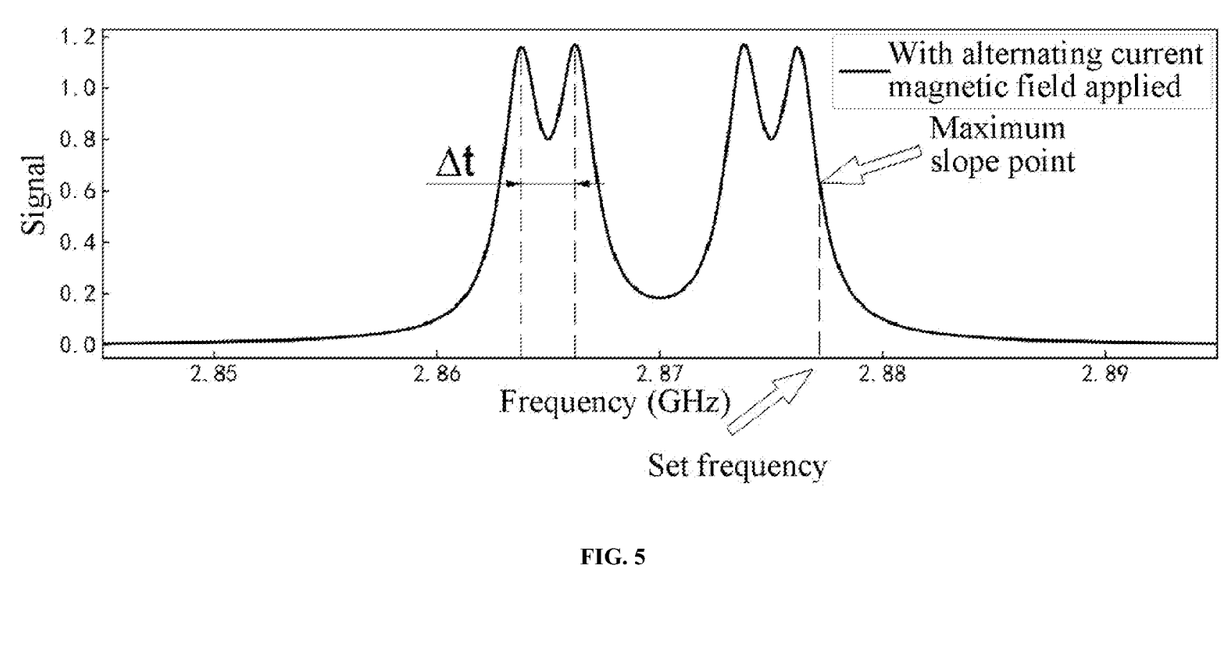
FIG. 5 is an ODMR atlas obtained by applying an alternating current magnetic field according to an embodiment II.

Based on the detection method in Embodiment I, a frequency-sweeping detection method is provided in this embodiment for crack detection, the specific operation is as follows: during the operation of a system, a microwave unit 6 is controlled to generate a microwave frequency-swept signal with a central frequency of 2.87 GHz, a corresponding ODMR spectrum is obtained by performing fixed-point frequency sweeping on each detection position, as shown in FIG. 5, magnetic field amplitude information of a corresponding detection position is calculated by an AT splitting value $\Delta t$ on the ODMR spectrum (It is found through experiments that the AT splitting value $\Delta t$ has a regular monotonous relationship with the amplitude of the alternating current magnetic field; and the amplitude of the alternating current magnetic field can be calculated through quantitative experiments), and then, crack information is determined according to the magnetic field amplitude information of different detection positions.

The advantage of such a detection method is that the magnetic field information of each detection position can be accurately detected, and the staff can determine whether the crack exists or not according to the magnetic field information, and can further determine the crack size information. However, there are still shortcomings that the detection speed is slow, and it is necessary to achieve the frequency sweeping process of the microwave at each detection position.

Embodiment III

Figure 6:
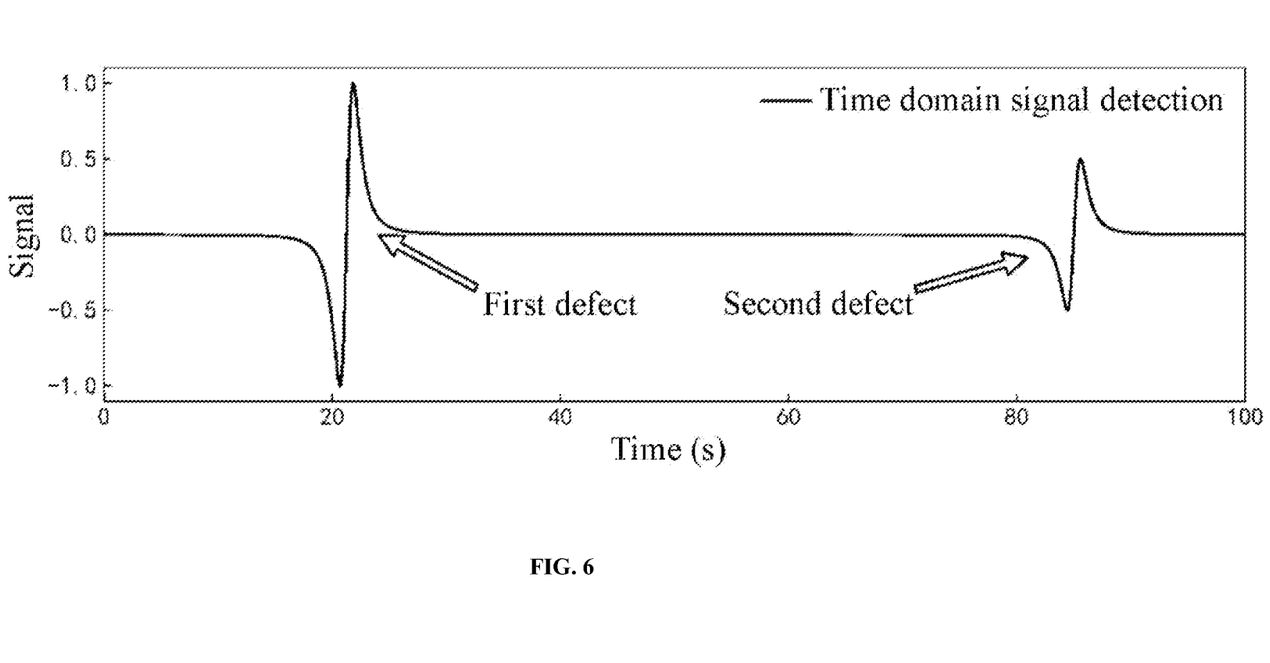
FIG. 6 is a time domain diagram according to an embodiment III.

Based on the detection method in Embodiment I, a single frequency detection method is provided in this embodiment for crack detection. Different from the frequency-sweeping detection method in Embodiment II, a single-frequency microwave is used for detection, with specific operation as follows: during the operation of the system, the microwave unit 6 is controlled to generate a single-frequency microwave with a set frequency, and a diamond NV color center 22 is excited by the single frequency microwave at each detection position, so as to obtain a corresponding ODMR spectrum (there is only one single point on such an ODMR spectrum), then detection results of different detection positions are made into a time domain diagram, as shown in FIG. 6, whether the crack exists or not is determined according to the fluctuation of the detection results.

The single frequency detection method has the advantages that the rapid detection can be achieved, and the detection efficiency is improved, but its disadvantage is that the single frequency detection method can only be used to determine whether the crack exists or not, rather than measuring the size information of the crack.

Further, in order to improve the difference of the detection results under different magnetic fields under the action of the single-frequency microwave, during the determination of the set frequency, the microwave unit is firstly controlled to generate a microwave sweep signal with a central frequency of 2.87 GHz, and an ODMR spectrum is obtained by performing fixed-point frequency sweeping on a selected detection position, then the microwave frequency value corresponding to the maximum slope point on the spectrum is determined, and the microwave frequency value is used as the set frequency of the microwave unit (refer specifically to label in FIG. 5)

Embodiment IV

In consideration of the frequency sweeping detection method and the single frequency detection method, a combined detection method is provided by combining the advantages and disadvantages of the frequency sweeping detection method and the single frequency detection method, which has the following specific steps as follows: during the operation of the system, the microwave unit 6 is controlled to generate a single-frequency microwave with a set frequency, and a diamond NV color center 22 is excited by the single frequency microwave at each detection position, so as to obtain a corresponding ODMR spectrum, so as to obtain a corresponding ODMR spectrum, then the detection results of different detection positions are made into a time domain diagram, and whether a crack exists or not is determined according to the fluctuation of the detection results. If determining that the crack exists at a certain part of an object to be detected, the quantum sensor 2 is moved back to the part, and then the microwave unit 6 is controlled to generate a microwave frequency-swept signal with the central frequency of 2.87 GHz. The corresponding ODMR spectrum is obtained by performing the fixed-point frequency sweeping on the part. Magnetic field peak information of the part is calculated through an AT splitting value on the ODMR spectrum, and crack size information is determined according to the magnetic field peak information.

Such a combined detection method integrates the advantages of the frequency sweeping detection method and the single frequency detection method, and can achieve the function of rapidly locating the crack position, and can measure the crack size and other information.

In the description of this specification, reference to terms "one embodiment", "examples", "specific examples", and the like means that a specific feature, structure, material or characteristic described in combination with the embodiment or example are included in at least one embodiment or example of the present disclosure. In this specification, the schematic descriptions of the above terms do not necessarily refer to the same embodiment or example. Moreover, the specific features, structures, materials or characteristics described may be combined in any suitable manner in any one or more embodiments or examples.

The preferred embodiments of the present disclosure disclosed above are only used to help illustrate the present disclosure. The preferred embodiments neither describe all the details in detail, nor limit the present disclosure to the specific implementations described. Apparently, a plurality of modifications and changes can be made according to the content of this specification. This specification selects and specifically describes these embodiments, in order to better explain the principle and practical application of the present disclosure, such that a person skilled in the art can well understand and use the present disclosure. The present disclosure is only limited by the claims, a full scope thereof and equivalents.

What is claimed is:

1. An eddy current flaw detection system based on a NV (nitrogen-vacancy) color center quantum sensing technology, comprising a laser transceiver processing unit, a quantum sensor, an excitation coil, a power supply unit, a microwave coil, and a microwave unit:

the laser transceiver processing unit is configured to generate trigger light to excite the quantum sensor, collect feedback fluorescence generated by the quantum sensor, and process and analyze the feedback fluorescence;

the microwave unit is configured to generate modulating microwaves, wherein the modulating microwaves act on the quantum sensor through the microwave coil;

the power supply unit is configured to supply an alternating current to the excitation coil so as to generate an alternating magnetic field, wherein the alternating magnetic field enables an eddy current to be generated on an object to be detected;

the quantum sensor is configured to sense a surrounding alternating magnetic field and generate feedback fluorescence under the action of the trigger light and the modulating microwaves;

the quantum sensor comprises a sensing optical fiber, both ends of the sensing optical fiber are respectively a light input end and a light output end, and the light output end is provided with a diamond NV color center, wherein the quantum sensor further comprises a support sleeve sleeved on the periphery of the sensing optical fiber, and the excitation coil is wound around the support sleeve.

2. The eddy current flaw detection system based on a NV color center quantum sensing technology according to claim 1, wherein the laser transceiver processing unit comprises a laser, a conjugate lens group, a dichroic mirror, an optical filter, a photodetector, a host computer, and an optical fiber coupler, trigger light generated by the laser is subjected to beam reduction by the conjugate lens group, enters a transmission optical fiber through the optical fiber coupler after being reflected by the dichroic mirror, and then is transmitted into the sensing optical fiber through the transmission optical fiber to trigger the diamond NV color center, partial feedback fluorescence generated by the diamond NV color center during operation returns along an original light path, the feedback fluorescence directly passes through the dichroic mirror and is collected by the photodetector after stray light is filtered by the optical filter, and the host computer is used to process and analyze the feedback fluorescence collected by the photodetector.

3. The eddy current flaw detection system based on a NV color center quantum sensing technology according to claim 2, wherein the laser transceiver processing unit further comprises an alarm, and the host computer is connected to the alarm and is used to control the alarm.

4. A detection method, wherein the method uses the eddy current flaw detection system according to claim 1 and comprises the following steps:

S1, measurement of zero magnetic field resonance splitting value: under a zero magnetic field environment, starting a laser transceiver processing unit and a microwave unit to draw an ODMR (optically detected magnetic resonance) spectrum of a diamond NV color center on a quantum sensor, and obtaining a zero magnetic field resonance splitting value by calculating an inter-peak spacing;

S2, parameter setting and starting: setting operating parameters of a power supply unit, serving the zero magnetic field resonance splitting value as an alternating current frequency, starting the laser transceiver processing unit and the microwave unit at the same time, controlling the quantum sensor to approach a surface of an object to be detected, and sensing a surrounding alternating magnetic field by the quantum sensor, and feeding back a fluorescence signal in time; and S3, analysis and processing: processing and analyzing, by the laser transceiver processing unit, the fluorescence signal to obtain crack information.

5. The detection method according to claim 4, wherein during the operation of the system, the microwave unit is controlled to generate a microwave frequency-swept signal with a central frequency of 2.87 GHZ, a corresponding ODMR spectrum is obtained by performing fixed-point frequency sweeping on each detection position, magnetic field amplitude information of the corresponding detection position is calculated through an AT splitting value on the ODMR spectrum, and then the crack information is determined according to the magnetic field amplitude information of different detection positions.

6. The detection method according to claim 4, wherein during the operation of the system, the microwave unit is controlled to generate a single-frequency microwave with a set frequency, and a diamond NV color center is excited by the single-frequency microwave at each detection position, so as to obtain a corresponding ODMR spectrum, then detection results of different detection positions are made into a time domain diagram, and whether a crack exists or not is determined according to the fluctuation of the detection results.

7. The detection method according to claim 6, wherein during the determination of the set frequency, the microwave unit is firstly controlled to generate a microwave frequency-swept signal with a central frequency of 2.87 GHZ, and an ODMR spectrum is obtained performing fixed-point frequency sweeping on a selected detection position, then a microwave frequency value corresponding to the maximum slope point on the spectrum is determined, and the microwave frequency value is used as the set frequency of the microwave unit.

8. The detection method according to claim 4, wherein during the operation of the system, the microwave unit is firstly controlled to generate a single-frequency microwave with a set frequency, a diamond NV color center is excited by the single-frequency microwave at each detection position, so as to obtain a corresponding ODMR spectrum; then detection results of different detection positions are made into a time domain diagram, and whether a crack exists or not is determined according to the fluctuation of the detection results; if determining that the crack exists at a certain part of an object to be detected, the quantum sensor is moved back to the part, then the microwave unit is controlled to generate a microwave frequency-swept signal with a central frequency of 2.87 GHZ, a corresponding ODMR spectrum is calculated by performing fixed-point frequency sweeping on the part, magnetic field amplitude information of the part is calculated through an AT splitting value on the ODMR spectrum, and then crack size information is determined according to the magnetic field amplitude information.

* * * * *